United States Patent
Beitia

(10) Patent No.: US 6,584,844 B2
(45) Date of Patent: Jul. 1, 2003

(54) VIBRATING BEAM GYROSCOPIC MEASURING APPARATUS WITH PIEZOELECTRIC EXCITATION

(75) Inventor: José Beitia, Saint Prix (FR)

(73) Assignee: Sagem SA (FR)

( * ) Notice: Subject to any disclaimer, the term of this patent is extended or adjusted under 35 U.S.C. 154(b) by 0 days.

(21) Appl. No.: 09/912,241

(22) Filed: Jul. 25, 2001

(65) Prior Publication Data

US 2002/0023491 A1 Feb. 28, 2002

(30) Foreign Application Priority Data

Jul. 28, 2000 (FR) .............................................. 00 09959

(51) Int. Cl.[7] ................................................ G01P 9/04
(52) U.S. Cl. ................................................... 73/504.16
(58) Field of Search ........................ 73/504.16, 504.15, 73/504.12; 310/329, 370

(56) References Cited

U.S. PATENT DOCUMENTS

| 5,049,776 A | | 9/1991 | Ogawa | 310/333 |
| 5,386,726 A | * | 2/1995 | Terajima | 73/504.16 |
| 5,597,955 A | | 1/1997 | Leger et al. | 73/504.16 |

FOREIGN PATENT DOCUMENTS

| EP | 0 764828 | 3/1997 |
| FR | 2 692 349 | 12/1993 |

* cited by examiner

*Primary Examiner*—John E. Chapman
(74) *Attorney, Agent, or Firm*—Larson & Taylor, PLC

(57) ABSTRACT

A gyroscopic measuring apparatus with a mechanical resonator comprises at least four identical, parallel vibrating beams integral with a common base and having the same natural frequency. Each beam supports piezoelectric elements for excitation purposes and for detecting vibration of the beam. The base is cruciform and the beams are disposed respectively at ends of branches of a cross formed by the base.

9 Claims, 1 Drawing Sheet

VIBRATING BEAM GYROSCOPIC MEASURING APPARATUS WITH PIEZOELECTRIC EXCITATION

FIELD OF THE INVENTION

The present invention relates to improvements made to gyroscopic measuring apparatus with a mechanical resonator, comprising at least four identical, parallel vibrating beams integral with a common base and having the same natural frequency, each beam supporting piezoelectric elements for excitation purposes and for detecting vibration of the beam.

DESCRIPTION OF THE PRIOR ART

A gyroscopic measuring apparatus of this type is described in document FR-A-2 692 349. In this known gyrometer, the mechanical resonator comprises four parallel beams which are supported by a solid base in the form of a four-sided plate (square or rectangular in particular), the beams being disposed in the corner regions of the base.

Such resonators are made from a monolithic, rectangular, parallelepipedic metal bar, the external dimensions of which, in cross section, enclose the four beams. This bar is then machined to form two longitudinal slits perpendicular to one another, separating the four beams of the resonator. These slits must be machined with extreme precision, in terms of both direction and dimension (slit width $e_0$), so that the beams thus delimited are strictly identical to one another and in practice as identical to one another as possible: any discrepancy in the dimensions destroys the symmetry of the device and causes vibrations which are transmitted to the exterior, through the support structure, and which upset the reliability of the gyrometer.

By way of example, in early gyrometers in which the beams were 60 mm in length, the width $e_0$ of the slits to be machined were in the order of 2 mm; in modern gyrometers, the length of the beams has been reduced to 38 mm and the width $e_0$ is in the order of 1 mm; in future gyrometers, it is desirable for the length of the beams to be reduced to approximately 15 mm, which would mean a value $e_0$ in the order of 0.5 mm to an accuracy of within more than 0.1 $\mu$m. Not only is it impossible to produce 0.5 mm slits economically, given current mechanical machining techniques (milling), it is practically impossible to respect the tolerance of 0.1 $\mu$m across the entire length of the slit. Using different machining techniques (laser, in particular) would make manufacturing costs too high.

The gyroscopic measuring apparatus described in the aforementioned document also has a disadvantage inherent in its structure. In effect, the mechanical resonator with four vibrating beams should, in theory, correspond to a double tuning fork, i.e. in terms of vibration, only two diagonally opposed beams should be coupled. The very fact that the four beams are integral with a same solid base in the form of a plate, the shape of which conforms to the external contour of the four beams, means that this base couples all the beams to one another: in other words, not only are the beams coupled in diagonally opposite pairs (as desired), adjacent beams are also coupled in pairs (parasitic and not desired), which is the equivalent of six tuning forks (four of which are not desired). As a result, it is very difficult to balance such a device, to the degree that it is impossible to obtain the perfect balance that would be desirable (notwithstanding the problems inherent in the manufacturing tolerances).

Finally, another point which needs to be taken into consideration is the pressing demand on the part of users for gyrometers which are as compact as possible, making them easier to house in restricted and encumbered spaces, in addition to reducing the cost of using (which may be once only) the missiles to which they are fitted (guided warheads for example).

Recently, progress has been made in reducing the size of the mechanical resonator, since it has been possible to reduce the length of the vibrating beams from 60 mm to 38 mm. However, it is extremely desirable to reduce this length further and current thinking is now tending towards vibrating beams of a length in the order of 15 mm. Reducing the length of the vibrating beams by half will in effect double the resonance frequency, which, with conventional resonator designs (notwithstanding the manufacturing difficulties explained above), would lead to resonance frequencies in the order of 14 kHz, which is not acceptable.

There is an additional difficulty which should be pointed out, linked to the known structure of the mechanical resonator, which is due to the proximity (for example a difference in the order of 140 Hz) of the resonance modes to the operating mode (for example 7 kHz), which exacerbates filtering problems in the mode used.

SUMMARY OF THE INVENTION

Accordingly, the underlying objective of the invention is to propose an improved design of a mechanical resonator that will enable a gyroscopic measuring apparatus to be made which best meets the various practical requirements whilst eliminating the disadvantages of existing gyrometers and whilst enabling more compact resonators to be made under acceptable economic conditions.

To these ends, the invention proposes a gyroscopic measuring apparatus with a mechanical resonator comprising at least four identical, parallel vibrating beams integral with a common base and having the same natural frequency, each beam supporting piezoelectric elements for excitation purposes and for detecting vibration of the beam, which gyroscopic measuring apparatus, being designed as proposed by the invention, is characterised in that the base is cruciform and in that the beams are respectively disposed at the ends of the branches of the cross formed by the base.

A mechanical resonator of this design can essentially be likened to a double tuning fork, i.e. a resonator with two mutually transverse tuning forks formed by the two pairs of opposite beams. The common part of the two tuning forks is reduced to only the intersecting volume of the two branches of the cross formed by the base and this single volume is considerably smaller than that of the plate-shaped base used in existing resonators. The two tuning forks are effectively decoupled from one another and parasitic vibration modes are suppressed by one order (third order instead of second order as with the existing resonators): the device of the invention therefore comes close, with a good approximation, to a structure comprising two mutually transverse tuning forks.

Furthermore, the four beams, which are relatively spaced apart from one another, can be more easily machined than the existing devices, making them less expensive to manufacture than the existing devices where the beams are closer together.

In view of the specific geometry which can be used for the layout of the four vibrating beams, a considerable shortening of these beams becomes conceivable—and in particular their length can be reduced to a dimension in the order of 15 mm instead of the 38 mm of the beams used in existing devices—whilst substantially conserving the same resonance frequency in the order of 7 kHz. Accordingly, it will then be possible to make smaller gyrometers than the currently known gyrometers, as desired by those who use them in numerous applications; alternatively, if using vibrating beams of the same dimensions as previously used, it becomes possible to reduce the resonance frequency (which may be reduced to 4500 Hz, for example), which is useful in terms of the design and operation of the electronics accompanying the gyroscopic measuring apparatus.

In one practical embodiment, which is easy and less expensive to machine, the branches of the cross formed by the base are substantially perpendicular to one another and are of identical lengths. This also makes it much easier to get the geometric balance of the structure right, which in turn makes it much easier to improve efficiency.

By preference, the branches of the cross are also all of the same width, which is substantially equal to the corresponding dimension of the beams. The height of the branches of the cross may be the same as the width of these branches (branches of a substantially square section) or may be different from this width, either greater or smaller. The choice of this height, which determines the choice of surface area of the cross section of the branches and hence their inertia, enables the value of the resonance frequency of the beams to be determined.

If the mechanical resonator has an embedded mounting foot which is integral with the base and extends parallel with the beams, it is desirable for the cross section of the foot to be disposed, at most, within the intersecting cross section of the branches of the cross formed by the base. This will make it easier to keep the foot more effectively decoupled from the vibrating elements.

In a first possible embodiment, the foot, relative to the base, extends remotely from the beams, in what is an otherwise normal layout. However, in view of the mutual spacing of the vibrating beams, it is also conceivable, in a second possible embodiment, for the foot, relative to the base, to extend on the same side as the beams and between them; the total length of the mechanical resonator will then correspond to the length of the vibrating beams plus only the thickness of the cross-shaped base. The resultant gain is a considerable fraction of the length of the device; this length, which may be in the order of 15 mm in devices with a projecting foot such as made possible by the invention, may be reduced even further to approximately 10 mm in devices where the foot is engaged between the beams: under these conditions, it becomes possible to design mechanical resonators with four vibrating beams which, encapsulated in a housing, will have overall external dimensions in the order of 14 mm in diameter and 10 mm in height for a resonance frequency in the order of 6 kHz.

In one example of a practical embodiment, and again with a view to simplifying the machining process as far as possible, it is of advantage if the lateral faces of the beams are parallel with and perpendicular to the branches of the cross formed by the base. This being the case, the four planes of the external faces of the four beams will then respectively describe a virtual square in vertical projection.

Finally, orifices are advantageously provided in each beam and/or recesses are hollowed into the faces of each beam in order simultaneously to adjust the resonance frequency of the beam and balance the beam so as to at least reduce, even eliminate, vibration in the foot: this double result, in the case of the vibrating device proposed by the invention, is achieved by this piercing/recessing work due to the fact that it effectively decouples the two tuning forks.

In the final analysis, the features proposed by the invention enable a gyroscopic measuring apparatus with a mechanical resonator to be obtained, which is small and therefore perfectly meets the aspirations of users; which is efficient and can achieve a performance in the order of 0.1 E/s, for example; which is robust and can therefore be used under difficult conditions, particularly under high acceleration conditions (fitted to guided warheads, for example).

BRIEF DESCRIPTION OF THE DRAWINGS

The invention will be more readily understood from the following detailed description of embodiments, which are given by way of illustration but are not restrictive in any respect. Throughout the description, reference will be made to the appended drawings, of which.

DETAILED DESCRIPTION OF THE INVENTION

Figure 1:
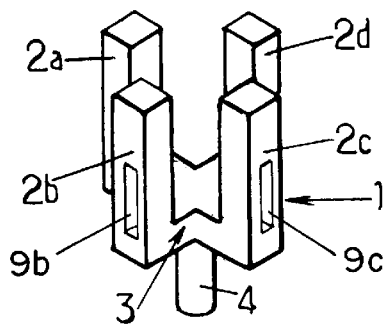
FIG. 1 is a schematic view in perspective of a mechanical resonator forming part of a gyroscopic measuring apparatus as proposed by the invention.
Figure 2:
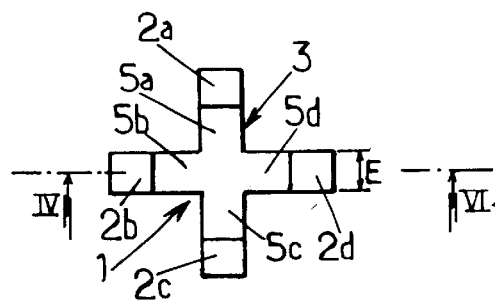
FIG. 2 is a plan view of the resonator illustrated in FIG. 1.
Figure 3:
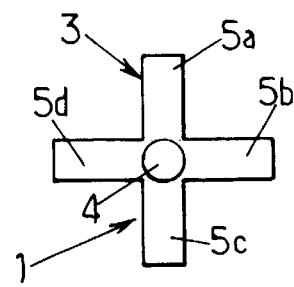
FIG. 3 is a view of the resonator of FIG. 1, seen from underneath.

FIGS. 1 to 3 show the general design of a gyrometer resonator with vibrating beams as proposed by the invention. In these drawings, only the mechanical structure of the resonator is illustrated as it is to this that the improvements proposed by the invention relate. The other components—piezoelectric elements excited in order to keep each beam vibrating; excitation circuits; piezoelectric elements for detecting vibrations in the beams; measuring circuit; casing; . . . ; have not been illustrated in order to keep the diagrams as clear as possible and reference may be made to document FR-A-2 692 349 for a description and illustration of these elements, which the person skilled in the art will be able to transpose to the mechanical structure of the resonator of the invention.

Like the resonator described in document FR-A-2 692 349, the resonator 1 proposed by the invention and illustrated in FIGS. 1 to 3 has at least four beams (respectively 2a, 2b, 2c and 2d) which are integral, at one of their ends, with a common base 3. The four beams 2 are mutually parallel and identical (and in particular are of the same length and have the same shape in cross section and surface area) and have the same natural frequency.

The base 3 also supports a mounting foot 4 which extends from said base substantially parallel with the vibrating beams 2.

The unit described above is made as a single piece and can be machined from a metal having a resiliency which varies little with temperature, such as that known by the name of "Elinvar".

In the example illustrated, the cross section of each beam is a four-cornered rectangle and, more specifically a square, in order to simplify the machining process.

In accordance with the invention, as may best be seen from FIGS. 2 and 3, the base 3 is generally cruciform in shape and, more advantageously, in order to retain the symmetry and obtain a better balanced structure, in the form of a cross with 5 mutually perpendicular branches. The four branches (respectively 5a to 5d) are all of the same length and respectively support at their respective ends the four beams 2a to 2d, which project substantially perpendicular to these branches.

In the disposition illustrated, which is simple to machine, the four branches 5a to 5d of the base 3 are all of the same width E, which is also substantially that of the four beams 2a to 2d.

Due to this arrangement, the resultant device can essentially be likened to a double tuning fork, made up of two tuning forks 2a, 2c and 2b, 2d disposed respectively transversely (substantially perpendicular) to one another, with a very reduced coupling (reduced to vibrating modes of the order 3) between the adjacent beams (i.e. 2a, 2b; 2b, 2c; 2c, 2d; 2d, 2a).

Moreover, the foot 4 is shaped so as to have a cross section which is at most equal to the intersecting section of the branches of the cross formed by the base 3. As illustrated in FIG. 3, the foot 4 is a cylinder describing a revolution, the diameter of which is smaller than the dimension of the side of the square formed by the intersection of the branches 5a–5d.

This produces a better decoupling of the foot 4 from the vibrating beams 2a–2d and reduces the vibrations transmitted to the foot 4 and hence the support structure.

Although a number of geometric conformations would be conceivable for the design of the beams, the base and the way they are combined, the simplest geometric configuration and hence the easiest and least expensive to machine is that illustrated in FIGS. 1 to 3: the four beams 2a–2d are substantially square in section and their lateral faces are parallel and perpendicular to the branches 5a–5d of the cross formed by the base; furthermore, the four planes of the external faces of the four respective beams (i.e. the four planes of the end faces of each of the branches of the cross) describe a virtual square in vertical projection.

The branches 5a–5d of the cross formed by the base 3 may be of a same height as their width (square cross section) or alternatively may be less than or greater than this width: the choice of this height will determine the mass and hence inertia of the branch and will enable the resonance frequency to be determined.

The conformation of the device illustrated in FIGS. 1 to 3 has the additional advantage of conferring some latitude in positioning the foot due to the significant mutual spacing of the beams 2a–2d.

Figure 4:
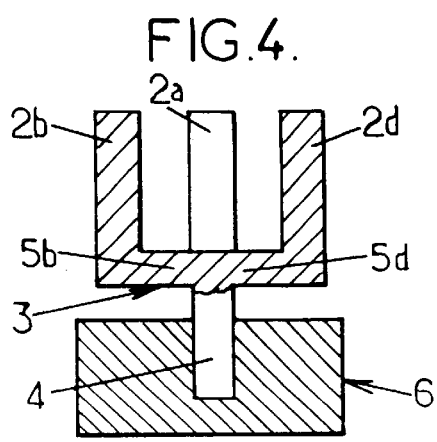
FIG. 4 is a view of the resonator of FIG. 1, seen in section, with its foot anchored in a support.

In FIG. 4, the resonator 1 is shown from a side view in section, along the line IV—IV of FIG. 2, and its foot 4, relative to the base 3, extends remotely from the beams 2a–2d, in a coaxial (centred) position relative thereto. In the mounted position, the foot 4 is partially embedded in a bore of a subjacent support 6, on which a protective casing (not illustrated) is then fitted. For a resonance frequency in the order of 6 kHz, the features proposed by the invention enable the height of the device to be reduced to approximately 15 mm, i.e. a global reduction in size of more than half as compared with the existing devices (approximately 38 mm) with a diameter of approximately 14 mm.

Figure 5:
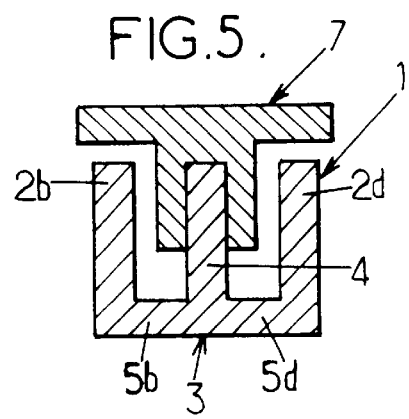
FIG. 5 is a view in section of another embodiment of a resonator proposed by the invention, with its foot anchored in a support.

However, the space available between the beams 2a–2d would make it conceivable to invert the foot 4, as illustrated in FIG. 5: the foot 4 will then extend between the beams 2a–2d, in a coaxial (centred) position, being of the same length as the beams, in order to simplify manufacture. This being the case, an overhead support 7 is provided, having a generally T-shaped cross section, in the leg of which a bore is provided so that the foot 4 can be partially embedded.

Under these conditions, the height of the device illustrated in FIG. 5 is smaller than the height of the device illustrated in FIG. 4 by the height of the foot 4, i.e. in the order of 5 mm: accordingly, a device can be provided which, encased in a housing (not illustrated) joined to the support 7, will have a diameter in the order of 14 mm with a height of approximately 10 mm, which largely meets the aspirations of users for extreme reductions in size.

In the mechanical resonator designed as proposed by the invention, the resonance frequency of each beam is adjusted and a balance obtained between the beams (giving zero vibration in the foot) simultaneously by mechanical work on the beams (in a manner known per se: holes are bored in and/or material is removed (e.g., hollows or recesses such as recesses 9b and 9c (FIG. 1) from each beam).

The results of a comparison between a mechanical resonator as described in document FR-A-2 692 349 having a base in the form of a solid plate with a mechanical resonator designed as proposed by the invention having a cross-shaped base but also having beams and a foot of identical shape and dimensions, are set out below:

a) the operating frequency, which before was in the order of 7000 Hz, is now reduced to approximately 4500 Hz (or alternatively, for a same resonance frequency, the dimensions of the device and in particular the height of the vibrating beams, are reduced); the device proposed by the invention is therefore more efficient than the existing device which makes performance in the order of 0.1 E/s conceivable;

b) the ratio of the maximum vibration amplitude of each beam to the maximum displacement measured to the bottom of the foot, which was $10^3$ to $10^4$ in the prior art device, becomes greater than $10^6$ in the device of the invention; the device proposed by the invention therefore exhibits excellent vibratory decoupling between the vibrating beams and the foot, and hence excellent mechanical isolation of the vibrating structure from the support structure;

c) the difference in frequency between parasite mode and operating mode shifts from approximately 140 Hz to approximately 250 Hz (for an operating frequency of approximately 6 to 7 kHz): this increase in bandwidth simplifies the filtering electronics, enabling the operating frequency to be isolated;

d) the prior art device has four vibrating beams which are coupled with one another to a high degree because of the links afforded by the solid plate-type base (this system being tantamount to an assembly of six tuning forks), whereas the device proposed by the invention has only two tuning forks, which are only slightly coupled due to the specific cruciform shape of the base;

e) the sensitivity of the frequency anisotropy to geometric imperfections of the resonator (and in particular the vibrating beams) is in the order of 1 $(Hz/\mu m)^{-1}$ in the case of the prior art device whereas it becomes in excess of 10 $(Hz/\mu m)^{-1}$ for the device of the invention; in other words, the machining tolerances of the resonator, and in particular the vibrating beams, can be reduced, which will reduce manufacturing costs. Generally speaking, in functional terms, the device of the design proposed by the invention has proved to be easier, and hence more economical, to manufacture than the prior art device and, all things considered, better meets the various practical requirements placed on it.

What is claimed is:

1. A gyroscopic measuring apparatus with a mechanical resonator comprising at least four identical, parallel vibrating beams integral with a common base and having the same natural frequency, each beam supporting piezoelectric elements for excitation purposes and for detecting vibration in the beam, wherein the base is cruciform and wherein the beams are respectively disposed at ends of branches of the cross formed by the base.

2. A gyroscopic measuring apparatus as claimed in claim 1, wherein said branches of said cross formed by the base are substantially perpendicular to one another and have identical lengths.

3. A gyroscopic measuring apparatus as claimed in claim 1, wherein said branches of said cross have the same width, which is substantially the same as the corresponding dimension of said beams.

4. A gyroscopic measuring apparatus as claimed in claim 1, in which said mechanical resonator has an embedded mounting foot which is integral with said base and extends parallel with said beams, wherein the cross section of said foot is inscribed at most within the intersecting cross section of said branches of said cross formed by the base.

5. A gyroscopic measuring apparatus as claimed in claim 4, wherein said foot, relative to said base, extends remotely from said beams.

6. A gyroscopic measuring apparatus as claimed in claim 4, wherein said foot, relative to said base, extends on the same side as said beams and between them.

7. A gyroscopic measuring apparatus as claimed in claim 1, wherein lateral faces of said four beams are parallel and perpendicular to said branches of said cross formed by the base.

8. A gyroscopic measuring apparatus as claimed in claim 7, wherein the four planes of the external faces of said respective four beams describe a virtual square in vertical projection.

9. A gyroscopic measuring apparatus as claimed in claim 1, wherein orifices are pierced through each beam and/or recesses are hollowed into said faces of each beam simultaneously to adjust the resonance frequency of the beam and balance the beam so as to at least reduce vibration in the foot.

* * * * *